(12) United States Patent
Hayakawa et al.

(10) Patent No.: US 10,252,219 B2
(45) Date of Patent: Apr. 9, 2019

(54) METHOD FOR OPERATING REVERSE OSMOSIS MEMBRANE DEVICE, AND REVERSE OSMOSIS MEMBRANE DEVICE

(71) Applicant: KURITA WATER INDUSTRIES LTD., Nakano-ku, Tokyo (JP)

(72) Inventors: Kunihiro Hayakawa, Tokyo (JP); Takahiro Kawakatsu, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 84 days.

(21) Appl. No.: 14/766,355

(22) PCT Filed: Feb. 14, 2014

(86) PCT No.: PCT/JP2014/053471
§ 371 (c)(1),
(2) Date: Aug. 6, 2015

(87) PCT Pub. No.: WO2014/129398
PCT Pub. Date: Aug. 28, 2014

(65) Prior Publication Data
US 2016/0016122 A1    Jan. 21, 2016

(30) Foreign Application Priority Data
Feb. 20, 2013   (JP) ................................. 2013-031032

(51) Int. Cl.
*B01D 63/10*    (2006.01)
*C02F 1/44*    (2006.01)
(Continued)

(52) U.S. Cl.
CPC .......... *B01D 63/10* (2013.01); *B01D 61/025* (2013.01); *C02F 1/441* (2013.01); *C02F 3/1268* (2013.01);
(Continued)

(58) Field of Classification Search
None
See application file for complete search history.

(56) References Cited

U.S. PATENT DOCUMENTS

2002/0027103 A1*  3/2002  Ando ................... B01D 61/145
                                                               210/650
2003/0205520 A1*  11/2003  Johnson ................ B01D 63/10
                                                               210/321.85
(Continued)

FOREIGN PATENT DOCUMENTS

JP         S61-185400 A    8/1986
JP         H10-230140 A    9/1998
(Continued)

OTHER PUBLICATIONS

JP2009240902A Machine Translation.pdf—Sugita, Kuzuya et al—Oct. 22, 2009.*
(Continued)

*Primary Examiner* — Krishnan S Menon
*Assistant Examiner* — Bradley R Spies
(74) *Attorney, Agent, or Firm* — Manabu Kanesaka (57) ABSTRACT

Provide is a reverse osmosis membrane device that is capable of treating raw water containing membrane-fouling substance in large quantities, such as MBR-treated water, in a stable manner while preventing decreases in permeate flow rate, and a method for operating thereof. A method for operating a reverse osmosis membrane device that treats raw water containing high-molecular-weight organic matter, wherein the raw water contains high-molecular-weight organic matter having a molecular weight of 10,000 or more at a concentration of 0.01 ppm or more, wherein the reverse osmosis membrane device is equipped with a spiral-type reverse osmosis membrane element that has a membrane surface area satisfying the below formula (1), and wherein
(Continued)

the reverse osmosis membrane device is operated at a permeate flux of 0.6 m/d or less:

$$\text{membrane surface area}(m^2) \geq n^2 \times (11/16) \quad (1)$$

wherein n represents a diameter (inches) of the reverse osmosis membrane element.

3 Claims, 3 Drawing Sheets

(51) Int. Cl.
- *B01D 61/02* (2006.01)
- *C02F 3/12* (2006.01)
- *C02F 103/04* (2006.01)
- *C02F 103/08* (2006.01)

(52) U.S. Cl.
CPC ........ *C02F 3/1273* (2013.01); *C02F 2103/04* (2013.01); *C02F 2103/08* (2013.01); *C02F 2303/20* (2013.01); *C02F 2303/22* (2013.01); *Y02A 20/131* (2018.01); *Y02W 10/15* (2015.05)

(56) References Cited

U.S. PATENT DOCUMENTS

| | | | | |
|---|---|---|---|---|
| 2004/0011723 | A1* | 1/2004 | Bradford | B01D 61/10 210/321.74 |
| 2006/0049093 | A1 | 3/2006 | Chikura et al. | |
| 2011/0290728 | A1* | 12/2011 | Viera Curbelo | B01D 61/022 210/652 |
| 2013/0146531 | A1* | 6/2013 | Tayalia | B01D 63/10 210/541 |

FOREIGN PATENT DOCUMENTS

| | | |
|---|---|---|
| JP | 2000-288542 A | 10/2000 |
| JP | 4107724 B2 | 6/2008 |
| JP | 2009-240902 A | 10/2009 |

OTHER PUBLICATIONS

PCT, "International Search Report for International Application No. PCT/JP2014/053471".
Non-Patent Literature 1: Practical Membrane Separation Techniques for Users (first print of first edition published on Apr. 30, 1996, Nikkan Kogyo Shimbun, Ltd.), p. 6.
Non-Patent Literature 2: Film Formation Techniques and Materials Evaluation for Water Treatment Membranes (first print of first edition published on Jan. 30, 2012, Science & Technology Co., Ltd.), p. 11.
Japan Patent Office, "Opposition for Japanese Patent No. 5828328," Jun. 2, 2016.
Kawasaki, M., "Section 3: Deterioration and fouling in the NF membrane-RO membrane and cleaning technology," The deterioration of the film and fouling measures: from the membrane fouling prevention and cleaning method to troubleshooting, Sep. 5, 2008, p. 296-301, NTS.
Moss, P. et al., "Twenty-five years of desalination in the Canary Islands: an historical review of the application of reverse osmosis using case studies and operational experience," Desalination, Nov. 9-12, 1999, p. 17-23, vol. 125, Elsevier Science B.V.
"Fluid Systems TFC-HR8"Elements: High Rejection, Low Pressure for Brackish Water, RO Element," Koch Membrane Systems, Lenntech.
"12.2 Reverse Osmosis (RO) Mode," Sep. 20, 2011, p. 620-625, The Society of Chemical Engineers, Japan.
Kameda, Y. et al., "Characterization of dissolved organic matter by three dimensional excitation emission matrix spectroscopy," Environmental Engineering Research, 1999, p. 209-215, vol. 36, Graduate School of Engineering, Hokkaido University.
Zheng, X. et al., "Identification and quantification of major organic foulants in treated domestic wastewater affecting filterability in dead-end ultrafiltration," Water Research, Science Direct, 2009, p. 238-244, vol. 43, Elsevier Ltd.
Jin, G. et al., "Dissolved organic matter in biologically treated sewage effluent (BTSE): Characteristics and comparison," Desalination, 2011, p. 365-372, vol. 278, Elsevier B.V.
Barker, D. J. et al., "Review Paper: A review of soluble microbial products (SMP) in wastewater treatment systems," Wat. Res., 1999, p. 3063-3082, vol. 33, No. 14, Pergamon, Elsevier Science Ltd, Great Britain.
"Brackish Water RO Elements: TML," Toray Industries, Inc., Jul. 2011.
"AG Series: Standard Brackish Water RO Elements," GE Powers & Water: Water & Process Technologies, Jul. 2010, p. 1-2. General Electric Company.
Bartels, C. R. et al., "Design considerations for wasterwater treatment by reverse osmosis," Water Science & Technology, 2005, p. 473-482, vol. 51, No. 6-7, IWA Publishing.
"LFC-Low Fouling Composite Membrane Series," Hydranautics High Performance Membrane Products, Apr. 1998, Technical Applications Bulletin—TAB 102, Lenntech.
"LFC-Low Fouling Composite Membrane Technology," Hydranautics, Jun. 2005, Technical Applications Bulletin—TAB 108, Nitto Denko.
Thompson, M. et al, "Case Study—Kranji High Grade Water Reclamation plant, Singapore," IMSETC, Sep. 2003, Sydney, Australia.
"Specifications—Sulaibiya Wastewater Treatment and Reclamation Plant, Kuwait," Water-technology.net, 2005, SPG Media Group PLC.
Hatt, J. W. et al., "Screening optimisation for indirect potable reuse," Water Science & Technology, Jan. 6, 2011, p. 2846-2852, vol. 63, No. 12, IWA Publishing.
Gottberg, A. V., et al., "Kuwait's giant membrane plant starts to take shape," Sulaibiya Water Reuse Project, p. 30-34, vol. 1312, Desalination & Water Reuse.
Ohkuma, N., "Water Recycling System with MBR-RO in Dubai," Bulletin of the Society of Sea Water Science, Aug. 4, 2009, p. 360-363, vol. 63, Hitachi Plant Technologies, Ltd., Japan.
Kogoshi, M. et al., "Application of the membrane treatment technology to the water circulation," Civil engineering materials, 2012, p. 22-25, vol. 54-4, Application of Membrane Technology to Water Circulation System.
Nagaoka, H., "Mechanism of drainage and sewage treatment by the membrane," Part II physical processing technology, May 2007, p. 153-165, NTS.
Guo, J. et al., "3.2.2. Effluent MWD comparison of WWTPs," Desalination, 2011, p. 370, vol. 278.

* cited by examiner

Fig.2a RELATIONSHIP BETWEEN PERMEATE FLUX AND CONCENTRATION FACTOR

Fig.2b RELATIONSHIP BETWEEN AVERAGE LINEAR VELOCITY AND CONCENTRATION FACTOR

Fig.3

METHOD FOR OPERATING REVERSE OSMOSIS MEMBRANE DEVICE, AND REVERSE OSMOSIS MEMBRANE DEVICE

FIELD OF THE INVENTION

The present invention relates to a reverse osmosis membrane device for treating water such as MBR-treated water containing high-molecular-weight organic matter that is adsorbed onto the membrane and accelerates fouling of the membrane, as well as to a method for operating it. The present invention also relates to a method for treating biologically treated water using the reverse osmosis membrane device.

BACKGROUND OF THE INVENTION

Reverse osmosis membranes have been used for removing ions, organic matter, or similar from raw water in applications such as desalination of seawater, production of ultrapure water, treatment of industrial water, and recovering discharged water (for example, Non-Patent Literature 1). A reverse osmosis membrane tends to decrease in permeate flux due to growth of microorganisms on the surface of the membrane or adsorption of organic matter thereto. A reverse osmosis membrane also tends to increase in modular differential pressure as a result of being fouled by suspended matter. This necessitates cleaning the reverse osmosis membrane regularly to recover the permeate flux and the pressure difference between the raw water and concentrate sides of the membrane element (hereinafter referred to as element differential pressure).

A spiral-type membrane element is known as the reverse osmosis membrane element. A known spiral-type membrane element is formed by disposing a permeate spacer between two reverse osmosis membranes, bonding three sides of the membranes with adhesives to form an envelope-like membrane. An opening of the envelope-like membrane is attached to a permeate collecting tube and the envelope-like membrane is wound together with a mesh-like raw water spacer feed spacer around the permeate collecting tube in a spiral manner. Raw water is fed to one end of the spiral membrane element and flows along the raw water spacer, and is consequently discharged as concentrated water from the other end of the spiral membrane element. While flowing along the raw water spacer, the water permeates the reverse osmosis membranes, thus being converted into permeate water. The permeate water flows along the permeate spacer in the envelope-like membrane and further into the permeate collecting tube, and is taken out from the end of the permeate collecting tube.

The spiral-type membrane element is equipped with the raw water spacer between the envelope-like membranes wound around the permeate collection tube so that channels for raw water are formed.

Increasing the thickness of the raw water spacer in the spiral-type membrane element reduces clogging of the raw water channels with suspended matter, thereby avoiding increase in the differential pressure, decrease in permeate flow rate, and deterioration in quality of permeated water. A spiral-type reverse osmosis membrane element has been in market whose raw water spacer has a large thickness for preventing clogging caused by suspended matter.

When the raw water spacer has a large thickness, the membrane surface area per element becomes smaller, and the permeate flow rate per element is reduced. Commercially available spiral-type reverse osmosis membrane elements have a membrane surface area of 42 $m^2$ (440 $ft^2$) or less.

Increasing the thickness of the raw water spacer does not have the effect of preventing decrease in permeate flux caused by the adsorption of membrane contaminants.

Reducing the thickness of the raw water spacer in order to increase the membrane surface area per element has also been proposed (for example, Patent Literature 1). In general, it has been considered that the channels tend to be clogged by suspended matter when the thickness of the raw water spacer is reduced. For elements whose raw water spacer has a small thickness, it has been unknown what characteristics they have and how they should be operated.

According to a membrane bioreactor (MBR) process, organic waste water such as sewage is treated with activated sludge in a biological treatment tank and the resulting mixture containing the activated sludge is separated into solid and liquid using an immersion membrane separation device immersed in the biological treatment tank. The process yields treated water with stable quality, and allows a high-load treatment with an increased concentration of activated sludge. A method for treating organic raw water has also been proposed in which MBR-treated water (water permeated through the membrane of an immersion membrane separation device) is fed to a reverse osmosis membrane device directly, and is subjected to reverse osmosis membrane separation (for example, Non-Patent Literature 2).

MBR-treated water contains a large quantity of high-molecular-weight organic matter having a molecular weight of 10,000 or more, which fouls membrane. Accordingly, the permeate flux decreases and the differential pressure of the membrane increases greatly over time in a reverse osmosis membrane device for treating MBR-treated water.

LIST OF LITERATURE

Patent Literature

Patent Literature 1: Japanese Patent No. 4107724 Non-Patent Literature
Non-Patent Literature 1: Practical Membrane Separation Techniques for Users (first print of first edition published on Apr. 30, 1996, Nikkan Kogyo Shimbun, Ltd.), page 6
Non-Patent Literature 2: Film Formation Techniques and Material Evaluation for Water Treatment Membranes (first print of first edition published on Jan. 30, 2012, Science & Technology Co., Ltd.), page 11

SUMMARY OF INVENTION

An object of the present invention is to provide a reverse osmosis membrane device that is capable of treating raw water containing membrane-fouling substance in large quantities, such as MBR-treated water, in a stable manner while preventing decreases in permeate flow rate, a method for operating thereof, and a method for treating biologically treated water using the reverse osmosis membrane device.

It is known that when water permeates through a reverse osmosis membrane, a phenomenon called concentration polarization occurs on the membrane surface, and a great degree of concentration polarization leads to a high concentration of the solute on the membrane surface. The inventors analyzed flow conditions in a spiral-type reverse osmosis membrane element, and found the following findings.
1) Reducing the permeate flux of the membrane lowers the degree of concentration polarization.

2) Increasing the hydraulic linear velocity on the membrane surface lowers the degree of concentration polarization.

3) Increasing the molecular weight of the solute raises the degree of concentration polarization.

The inventors also ascertained that high-molecular-weight organic matter having a molecular weight of 10,000 or more, in particular, biological metabolites such as polysaccharides and proteins, is a causative substance of membrane fouling, and that an increased concentration of the high-molecular-weight organic matter on the membrane surface due to concentration polarization leads to significant decreases in permeate flux and permeate flow rate.

The inventors found further the following findings. The spiral-type reverse osmosis membrane elements having the larger membrane surface area per element has the smaller permeate flux than the conventional spiral-type reverse osmosis membrane elements for the same permeate flow rate. Operation at a permeate flux not exceeding a specified value lowers the degree of concentration polarization, thereby preventing decreases in permeate flux and permeate flow rate. Ensuring the hydraulic linear velocity is equal to or larger than a specified velocity further suppresses decreases in permeate flux.

The present invention is based on these findings, and the gist thereof is as follows.

[1] A method for operating a reverse osmosis membrane device that treats raw water containing high-molecular-weight organic matter, wherein the raw water contains high-molecular-weight organic matter having a molecular weight of 10,000 or more at a concentration of 0.01 ppm or more, wherein the reverse osmosis membrane device is equipped with a spiral-type reverse osmosis membrane element that has a membrane surface area satisfying the below formula (1), and wherein the reverse osmosis membrane device is operated at a permeate flux of 0.6 m/d or less:

$$\text{membrane surface area}(m^2) \geq n^2 \times (11/16) \quad (1)$$

wherein n represents a diameter (inches) of the reverse osmosis membrane element.

[2] The method according to [1] for operating a reverse osmosis membrane device, wherein the permeate flux is 0.45 m/d or less.

[3] The method according to [1] or [2] for operating a reverse osmosis membrane device, wherein the reverse osmosis membrane device is operated with a flow rate of concentrate being 0.1 m/s or more in linear velocity.

[4] The method according to any one of [1] to [3] for operating a reverse osmosis membrane device, wherein the diameter n of the reverse osmosis membrane element is 8 inches.

[5] The method according to any one of [1] to [4] for operating a reverse osmosis membrane device, wherein the raw water is MBR-treated water.

[6] A reverse osmosis membrane device for treating raw water containing 0.01 ppm or a higher concentration of high-molecular-weight organic matter having a molecular weight of 10,000 or more, wherein the device comprises a spiral-type reverse osmosis membrane element that has a membrane surface area satisfying the below formula (1), and the device is configured to be operated at a permeate flux of 0.6 m/d or less:

$$\text{membrane surface area}(m^2) \geq n^2 \times (11/16) \quad (1)$$

wherein n represents a diameter (inches) of the reverse osmosis membrane element.

[7] A method for treating biologically treated water, the method comprising subjecting the biologically treated water to reverse osmosis membrane separation with the reverse osmosis membrane device according to [6].

Advantageous Effects of the Invention

According to the present invention, raw water containing large quantities of membrane-fouling substances such as MBR-treated water is treated stably by the reverse osmosis membrane separation with preventing decreases in permeate flow rate.

Namely, according to the present invention, the increased membrane surface area per element allows the permeate flux to be smaller than a conventional spiral-type reverse osmosis membrane elements for the same permeate flow rate. Operation at a permeate flux not exceeding the specified value lowers the degree of concentration polarization, thereby suppressing decreases in permeate flow rate. This allows stable processing to be continued for long periods of time.

DESCRIPTION OF EMBODIMENTS

The following describes embodiments of the present invention in detail.

<Raw Water>

In the present invention, the raw water subjected to reverse osmosis membrane separation with the reverse osmosis membrane device contains 0.01 ppm or a higher concentration of high-molecular-weight organic matter having a molecular weight of 10,000 or more. High-molecular-weight organic matter having a molecular weight of 10,000 or more, in particular, biological metabolites such as polysaccharides and proteins, is likely to foul the membrane and therefore often causes decrease in permeate flux. The raw water to be treated by the present invention contains the high-molecular-weight organic matter at 0.01 ppm or more, for example 0.05 to 0.5 ppm. Such raw water tends to lower greatly permeate flux of a reverse osmosis membrane.

The raw water containing high-molecular-weight organic matter may be water recovered from various kinds of discharged water, and biologically treated water such as MBR-treated water.

The method for measuring the concentration of the high-molecular-weight organic matter having a molecular weight of 10,000 or more in the water is not limited. Instruments that measure TOC or similar through molecular weight fractionation using chromatographic techniques such as LC-OCD (liquid chromatography-organic carbon detection) and HPLC (high-performance liquid chromatography) can be used for the measurement. The concentration can also be measured by separating substances having a molecular weight of 10,000 or more and substances having a molecular weight of less than 10,000 using a UF membrane with a cutoff molecular weight of 10,000, and by subsequently conducting TOC analysis on the concentration of the substances having a molecular weight of 10,000 or more.

<Spiral-Type Reverse Osmosis Membrane Element>

The spiral-type reverse osmosis membrane element installed in the reverse osmosis membrane device according to the present invention has a spiral-type membrane unit having a flat envelope-like membrane wound spirally, a raw water spacer arranged at a primary side (one surface) of the membrane, and a permeated water spacer arranged in the membrane (a secondary side).

The diameter of the spiral-type reverse osmosis membrane element is not limited. Elements with diameters of 4 inches, 8 inches, and 16 inches are commercially available. Usually used is an 8-inch spiral-type reverse osmosis membrane element.

The length of the element is usually, but not limited to, approximately 1 m.

The spiral-type reverse osmosis membrane element used in the present invention has a membrane surface area that satisfies the formula (1) below:

$$\text{Membrane surface area}(m^2) \geq n^2 \times (11/16) \tag{1}$$

where n represents the diameter (inches) of the reverse osmosis membrane element.

When the membrane surface area of the spiral-type reverse osmosis membrane element does not satisfy the formula (1) above, and the membrane surface area($m^2$) is smaller than $n^2 \times (11/16)$, the permeate flux for the same permeate flow rate cannot be reduced, and the object of the present invention is unattainable.

The membrane surface area($m^2$) of the spiral-type reverse osmosis membrane element is preferably $n^2 \times 11/16$ or more, more preferably $n^2 \times 13/16$ or more. The membrane surface area is preferably $n^2 \times 16/16$ or less for the purpose that thickness of the reverse osmosis membrane, the raw water spacer, and the permeate spacer have a required amount.

The material of which the reverse osmosis membrane is made is not limited. An aromatic polyamide membrane synthesized on a substrate using phenylene diamine and an acid chloride is preferred because a membrane with a high rejection is preferred. The commonly used range of thicknesses of the reverse osmosis membrane is 0.1 to 0.15 mm.

The shape of the raw water spacer and the permeate spacer is not limited. Commonly used is a mesh spacer that is composed of regularly spaced wires made of plastics such as polyethylene, polypropylene. The wires have the same or different diameters, and are stacked to cross each other at an angle of 45° to 90°.

Examples of raw water spacers now in common use include those having a thickness of 0.69 mm (26 mil), 0.71 mm (28 mil), or 0.86 mm (34 mil). In the present invention, it is preferred to use a raw water spacer having a thickness of 0.6 mm or less, for example, approximately 0.2 to 0.6 mm, so that the formula (1) above is satisfied. Too large a thickness of the raw water spacer leads to a small membrane surface area per element, which makes the formula (1) above no longer satisfied. Too small a thickness of the raw water spacer makes the occlusion of channels with suspended matter.

It is preferable that the mesh-like raw water spacer has the porosity of 60% to 95% and the mesh size of 1.0 to 4.0 mm. The mesh-like raw water spacer having such a porosity and a mesh size contributes to suppression of concentration polarization by providing a raw water-mixing effect while maintaining sufficient water flowability. The porosity is the percentage of the spatial volume minus the volume of the wires divided by the spatial volume. The mesh size is the spacing between the wires.

The thickness of the permeate spacer is not limited. The thickness is preferably 0.1 to 0.25 mm. Too large a thickness of the permeate spacer leads to a small membrane surface area per element, as likely as the raw water spacer. Too small a thickness leads to a large differential pressure and therefore a small permeate flow rate.

<Permeate Flux>

In the present invention, the reverse osmosis membrane device with the spiral-type reverse osmosis membrane element having the membrane surface area as specified above is operated at a permeate flux of 0.6 m/d or less.

The pure water permeate flux of a reverse osmosis membrane device at a standard operation pressure is generally 0.7 to 0.85 m/d, and it is customary to set the permeate flux at approximately 0.5 to 0.7 m/d when applying raw water containing inorganic salts or organic matter.

The inventors have found experimentally that high-molecular-weight organic matter having a molecular weight of 10,000 or more fouls the reverse osmosis membrane and that the concentration of the high-molecular-weight organic matter concentration on the membrane surface exceeding 1 ppm leads to significant decreases in permeate flux. The inventors have found that when the raw water contains 0.01 ppm or more high-molecular-weight organic matter having a molecular weight of 10,000 or more, a concentration factor for the membrane surface concentration exceeding 100 leads to significant decreases in permeate flux. Ensuring the concentration factor does not exceed 100 requires that the permeate flux is 0.6 m/d or less. Thus in the present invention, the reverse osmosis membrane device is operated at a permeate flux of 0.6 m/d or less, preferably 0.45 m/d or less. Excessive reduction of the permeate flux is, however, uneconomical because it increases the number of membranes needed. It is thus preferable that the permeate flux is 0.2 m/d or more.

The flow rate of the concentrate in an 8-inch spiral-type reverse osmosis membrane element is usually 2.0 to 8.0 $m^3/h$, and the linear velocity in this condition is 0.05 to 0.15 m/s. In the present invention, the hydraulic linear velocity of the concentrate preferably maintained at 0.1 m/s or more in order not to increase the membrane surface concentration, although the range depends on the permeate flux. Reducing the linear velocity to less than 0.1 m/s is not preferred because it leads to a concentration factor on the membrane surface exceeding 100 and therefore significant decreases in permeate flux. A linear velocity exceeding 0.2 m/s is not preferred because it leads to too large a pressure loss and also increases the possibility of membrane breakage. A more preferred linear velocity is thus 0.1 to 0.2 m/s.

When an 8-inch spiral-type reverse osmosis membrane element having a membrane surface area smaller than $n^2 \times (11/16) = 44$ $m^2$ is operated under the conditions satisfying the above, the permeate flow rate and recovery rate of water are decreased. Satisfying the above permeate flux and linear velocity conditions therefore requires the use of the spiral-type reverse osmosis membrane element having the membrane surface area of 44 $m^2$ or more, namely $n^2 \times (11/16)$ or more.

<Treatment of Biologically Treated Water>

The reverse osmosis membrane device according to the present invention is particularly suitable for use in reverse osmosis membrane separation of biologically treated water.

Figure 1A:
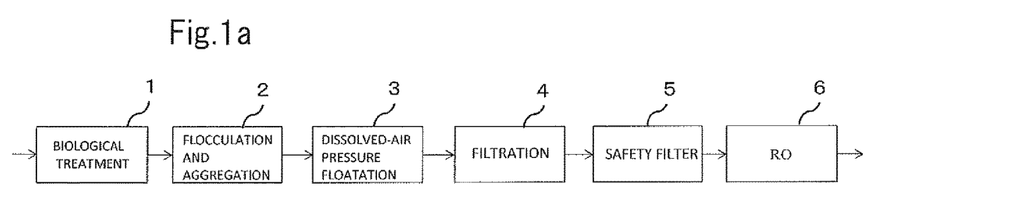
FIGS. 1a, 1b, and 1c are flow diagrams illustrating embodiments of methods according to the present invention for treating biologically treated water.
Figure 1B:
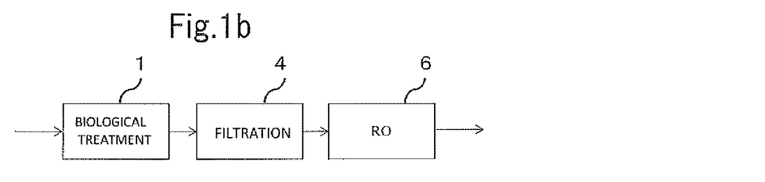
Figure 1C:
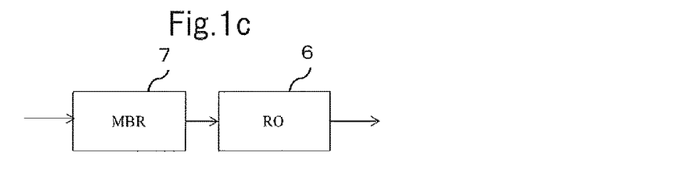

FIGS. 1a, 1b, and 1c are flow diagrams illustrating embodiments of methods according to the present invention for treating biologically treated water, in which a reverse osmosis membrane device according to the present invention is used.

In FIG. 1a, the biologically treated water is treated through aerobic and/or anaerobic biological treatment means 1, flocculation and aggregation treatment means 2, solid-liquid separation means 3 such as dissolved-air pressure floatation, filtration means 4, a safety filter 5, and a reverse osmosis membrane device 6.

In FIG. 1b, water treated by the biological treatment means 1 is directly fed to the filtration means 4 such as a membrane filtration device, and the resulting water is introduced into the reverse osmosis membrane device 6 and subjected to reverse osmosis membrane separation. In FIG. 1c, water treated by an MBR (immersion membrane separation device) 7 is directly introduced into the reverse osmosis membrane device 6 and treated. Methods according to the present invention are not limited to these methods.

EXAMPLES

The present invention is described in more detail with reference to Reference Examples, Examples, and Comparative Examples.

Reference Example 1

Tables 1 and 2 below show the relationship between a thickness of a raw water spacer and a membrane surface area, and the relationship between permeate flux and linear velocity at a constant flow rate in a spiral-type reverse osmosis membrane element having a diameter of 8 inches ($n^2 \times (11/16) = 44$).

As is clear from Tables 1 and 2, reducing the thickness of the raw water spacer increases the membrane surface area per element, thereby reducing decreases in flux caused by fouling. Too small a thickness of the raw water spacer, for example, 0.2 mm or less, leads to high hydraulic resistance, which heightens the risk of occlusion with suspended matter or similar.

TABLE 1

<Fixed conditions of permeate flow rate: 1.1 m³/h, and concentrate flow rate: 5.1 m³/h>

| Membrane surface area (m²) | Thickness of raw water spacer (mm) | Permeate flux (m/d) | Linear velocity (m/s) |
|---|---|---|---|
| 33.6 | 1.00 | 0.79 | 0.086 |
| 37.1 | 0.86 | 0.71 | 0.091 |
| 41.8 | 0.71 | 0.63 | 0.097 |
| 44 | 0.65 | 0.60 | 0.101 |
| 50.7 | 0.50 | 0.52 | 0.114 |
| 63.6 | 0.30 | 0.42 | 0.151 |
| 72.8 | 0.20 | 0.36 | 0.198 |

TABLE 2

<Fixed conditions of permeate flow rate: 1.1 m³/h, and concentrate flow rate: 3.6 m³/h>

| Membrane surface area (m²) | Thickness of raw water spacer (mm) | Permeate flux (m/d) | Linear velocity (m/s) |
|---|---|---|---|
| 33.6 | 1.00 | 0.79 | 0.060 |
| 37.1 | 0.86 | 0.71 | 0.063 |

TABLE 2-continued

<Fixed conditions of permeate flow rate: 1.1 m³/h, and concentrate flow rate: 3.6 m³/h>

| Membrane surface area (m²) | Thickness of raw water spacer (mm) | Permeate flux (m/d) | Linear velocity (m/s) |
|---|---|---|---|
| 41.8 | 0.71 | 0.63 | 0.067 |
| 44.0 | 0.65 | 0.60 | 0.070 |
| 50.7 | 0.50 | 0.52 | 0.079 |
| 63.6 | 0.30 | 0.42 | 0.105 |
| 72.8 | 0.20 | 0.36 | 0.137 |

Reference Example 2

The relationship between permeate flux or average linear velocity and concentration factor (membrane surface concentration/average bulk concentration) was analyzed in a reverse osmosis membrane separation process in which the raw water was an aqueous solution of NaCl or water containing high-molecular-weight organic matter having an average molecular weight of 10,000. The results are illustrated in FIGS. 2a and 2b.

Figure 2A:
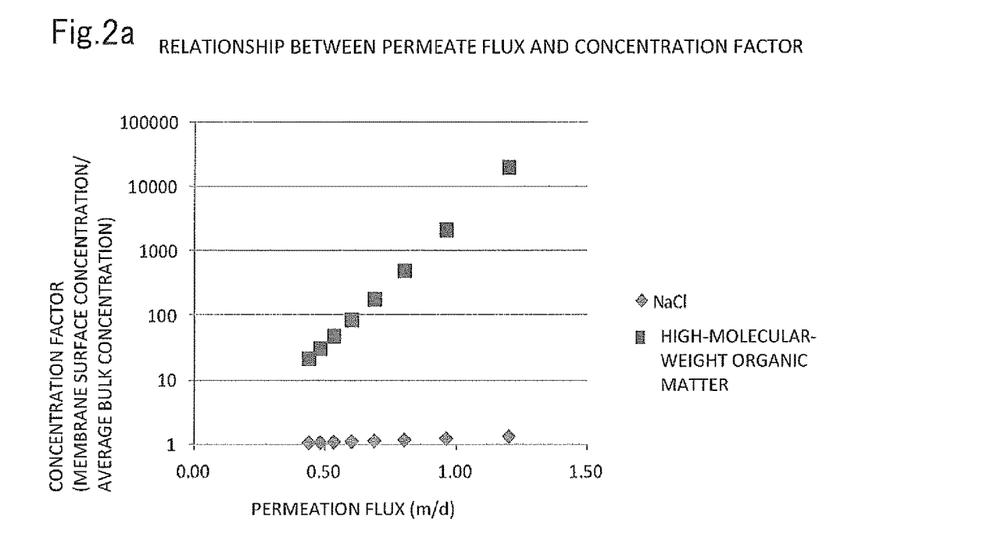
FIG. 2a is a graphical representation of relationships between permeate flux and concentration factor in a reverse osmosis membrane separation process in which the raw water is aqueous solution of NaCl or water containing high-molecular-weight organic matter having an average molecular weight of 10,000.
Figure 2B:
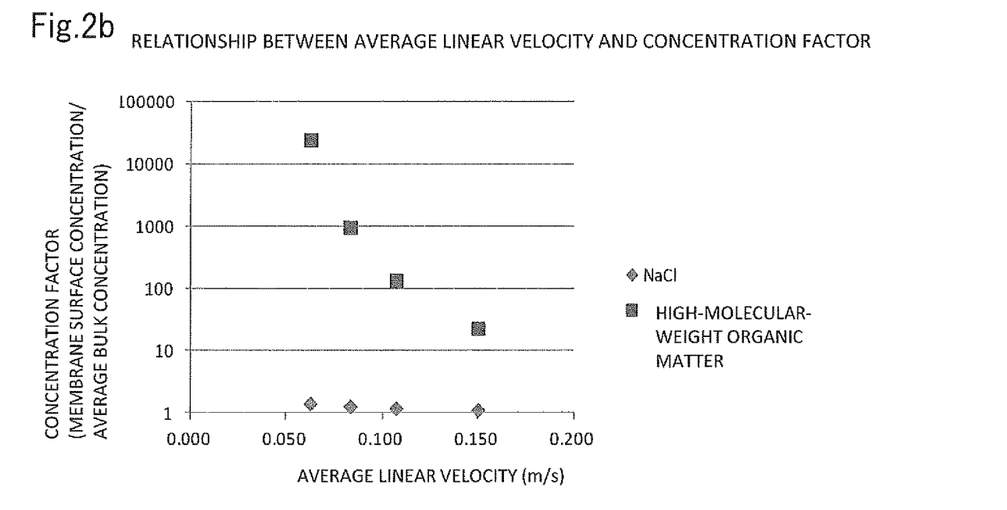
FIG. 2b is a graphical representation of relationships between average linear velocity and concentration factor in the same process.

As can be seen from FIGS. 2a and 2b, the concentration of high-molecular-weight organic matter on the membrane surface significantly rises with increasing permeate flux and decreasing average linear velocity in general, as compared with low-molecular-weight substances such as NaCl, although with some differences between polymer species.

Example 1

The inventors assumed the use of an 8-inch spiral-type reverse osmosis membrane element having a membrane surface area of 44.0 m². A flat-sheet membrane piece was cut out from a reverse osmosis membrane (a thickness of 0.13 mm) "ES20" of Nitto Denko Corporation to 50 mm in width×800 mm in length, and the piece was installed in a test flat-sheet membrane cell illustrated in FIG. 3 together with a 0.65 mm-thick mesh spacer of polypropylene as a raw water spacer (porosity 92%, mesh size 2.6 mm) and a 10 mm-thick ceramic (sintered porous ceramic) spacer as a permeate spacer.

Figure 3:
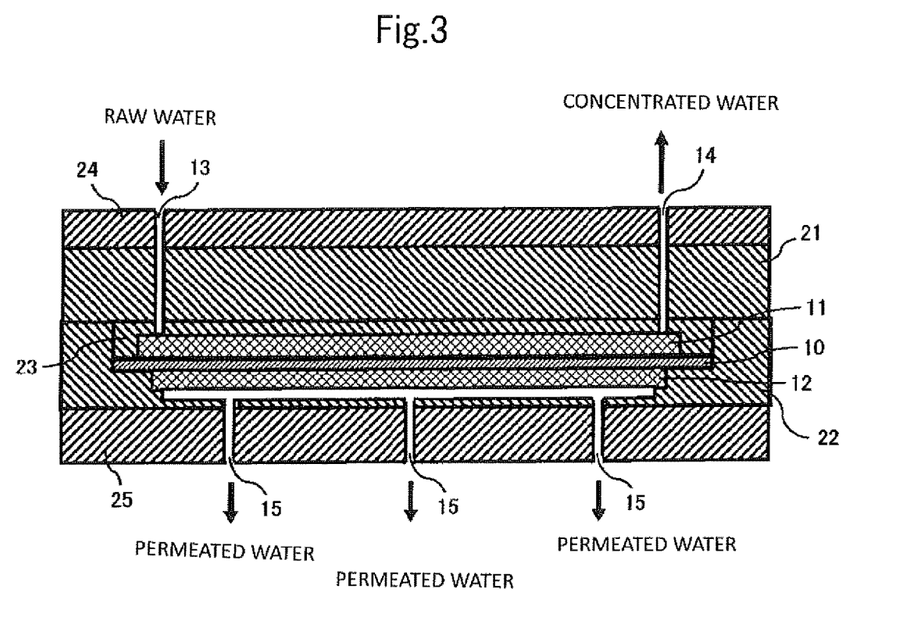
FIG. 3 is a schematic cross-sectional view of a flat-sheet membrane cell used in Examples.

The flat-sheet membrane cell illustrated in FIG. 3 has a structure in which a membrane unit is held in a space formed by channel-forming members of acrylic resin 21, 22, and 23 and pressure reinforcement members of SUS 24 and 25. The membrane unit is provide with a raw water spacer 11, a permeate spacer 12, and a reverse osmosis membrane 10 arranged therebetween.

The raw water flows from a raw water inlet 13 into the primary side of the reverse osmosis membrane 10 and flows along the raw water spacer 11. The water permeated through the reverse osmosis membrane 10 flows along the permeate spacer 12, and is taken out from a permeate outlet 15. The concentrated water is taken out from a concentrate outlet 14.

Biologically treated water was used as raw water after being treated by a flocculation and aggregation process and a filtration process. The raw water was fed such that a permeate flux became 0.6 m/d, and the concentrated water flowed at a linear velocity of 0.11 m/s. The permeate flow rate was measured after passing water for 500 hours.

The initial permeate flow rate was 1.10 m³/h and the initial concentrate flow rate was 5.66 m³/h, both expressed as the flow rate of an 8-inch element.

The concentration of high-molecular-weight organic matter having a molecular weight of 10,000 or more in the raw water was 0.05 ppm. The results are shown in Table 3.

Comparative Example 1

The same example as Example 1 was conducted except that a 0.86 mm-thick raw water spacer of polypropylene was used. The inventors assumed the use of an 8-inch reverse osmosis membrane element having a membrane surface area of 37.1 m². The permeate flow rate was measured after passing water for 500 hours. The initial permeate flow rate was 0.93 m³/h and the initial concentrate flow rate was 6.32 m³/h, both expressed as the flow rate of an 8-inch element. The results are shown in Table 3.

Comparative Example 2

The same example as Example 1 was conducted except that the permeate flux was made 0.70 m/d. The permeate flow rate was measured after passing water for 500 hours. The initial permeate flow rate was 1.28 m³/h and the initial concentrate flow rate was 5.66 m³/h, both expressed as the flow rate of an 8-inch element. The results are shown in Table 3.

Comparative Example 3

The same example as Comparative Example 1 was conducted except that the permeate flux was made 0.70 m/d. The permeate flow rate was measured after passing water for 500 hours. The initial permeate flow rate was 1.08 m³/h and the initial concentrate flow rate was 6.32 m³/h, both expressed as the flow rate of an 8-inch element. The results are shown in Table 3.

Example 2

The same example as Example 1 was conducted except that the flow rate of the concentrated water was made 0.09 m/s in linear velocity. The permeate flow rate was measured after passing water for 500 hours. The initial permeate flow rate was 1.10 m³/h and the initial concentrate flow rate was 4.63 m³/h, both expressed as the flow rate of an 8-inch element. The results are shown in Table 3.

Comparative Example 4

The same example as Comparative Example 1 was conducted except that the flow rate of the concentrated water was made 0.09 m/s in linear velocity. The permeate flow rate was measured after passing water for 500 hours. The initial permeate flow rate was 0.93 m³/h and the initial concentrate flow rate was 5.17 m³/h, both expressed as the flow rate of an 8-inch element. The results are shown in Table 3.

Comparative Example 5

The same example as Comparative Example 2 was conducted except that the flow rate of the concentrated water was made 0.09 m/s in linear velocity. The permeate flow rate was measured after passing water for 500 hours. The initial permeate flow rate was 1.28 m³/h and the initial concentrate flow rate was 4.63 m³/h, both expressed as the flow rate of an 8-inch element. The results are shown in Table 3.

Comparative Example 6

The same example as Comparative Example 1 was conducted except that the permeate flux was made 0.70 m/d and that the flow rate of the concentrated water was made 0.09 m/s in linear velocity. The permeate flow rate was measured after passing water for 500 hours. The initial permeate flow rate was 1.08 m³/h and the initial concentrate flow rate was 5.17 m³/h, both expressed as the flow rate of an 8-inch element. The results are shown in Table 3.

Example 3

The same example as Example 2 was conducted except that a 0.50 mm-thick raw water spacer of polypropylene was used. The inventors assumed the use of an 8-inch spiral-type reverse osmosis membrane element having a membrane surface area of 50.7 m². The permeate flow rate was measured after passing water for 500 hours. The initial permeate flow rate was 1.27 m³/h and the initial concentrate flow rate was 4.11 m³/h, both expressed as the flow rate of an 8-inch element. The results are shown in Table 3.

Example 4

The same example as Example 2 was conducted except that a 0.40 mm-thick raw water spacer of polypropylene was used. The inventors assumed the use of an 8-inch reverse osmosis membrane element having a membrane surface area of 56.4 m². The permeate flow rate was measured after passing water for 500 hours. The initial permeate flow rate was 1.41 m³/h and the initial concentrate flow rate was 3.65 m³/h, both expressed as the flow rate of an 8-inch element. The results are shown in Table 3.

Example 5

The same example as Example 3 was conducted except that the permeate flux was made 0.50 m/d and that the flow rate of the concentrated water was made 0.11 m/s in linear velocity. The permeate flow rate was measured after passing water for 500 hours. The initial permeate flow rate was 1.06 m³/h and the initial concentrate flow rate was 5.02 m³/h, both expressed as the flow rate of an 8-inch element. The results are shown in Table 3.

Example 6

The same example as Example 4 was conducted except that the permeate flux was made 0.45 m/d and that the flow rate of the concentrated was made 0.11 m/s in linear velocity. The permeate flow rate was measured after passing water for 500 hours. The initial permeate flow rate was 1.06 m³/h and the initial concentrate flow rate was 4.47 m³/h, both expressed as the flow rate of an 8-inch element. The results are shown in Table 3.

Example 7

The same example as Example 1 was conducted except that a 0.30 mm-thick raw water spacer of polypropylene was used. The inventors assumed the use of an 8-inch spiral-type reverse osmosis membrane element having a membrane surface area of 63.6 m² and that the permeate flux was made 0.40 m/d. The permeate flow rate was measured after passing water for 500 hours. The initial permeate flow rate was 1.06 m³/h and the initial concentrate flow rate was 3.78 m³/h, both expressed as the flow rate of an 8-inch element. The results are shown in Table 3.

Comparative Example 7

The same example as Comparative Example 3 was conducted except that the raw water had the concentration of high-molecular-weight organic matter having a molecular weight of 10,000 or more of 0.005 ppm. The permeate flow rate was measured after passing water for 500 hours. The initial permeate flow rate was 1.08 m³/h and the initial concentrate flow rate was 6.32 m³/h, both expressed as the flow rate of an 8-inch element. The results are shown in Table 3.

those skilled in the art that various changes are possible without departing from the spirit and scope of the present invention.

The present invention is based on Japanese Patent Application No. 2013-031032 filed on Feb. 20, 2013, which is hereby incorporated by reference herein in its entirety.

REFERENCE SIGNS LIST

1 Biological treatment means
2 Flocculation and aggregation treatment means

TABLE 3

| | Membrane surface area (m²) | Thickness of raw water spacer (mm) | Permeate flux (m/d) | Concentrate linear velocity (m/s) | Concentration of high-molecular-weight organic matter (ppm) | Initial permeate flow rate (m³/h) | Initial concentrate flow rate (m³/h) | Permeate flow rate at 500 hours (m³/h) | Retention rate of initial permeate flow rate (%) |
|---|---|---|---|---|---|---|---|---|---|
| Example 1 | 44.0 | 0.65 | 0.60 | 0.11 | 0.05 | 1.10 | 5.66 | 1.04 | 94.5 |
| Comparative Example 1 | 37.1 | 0.86 | 0.60 | 0.11 | 0.05 | 0.93 | 6.32 | 0.88 | 94.6 |
| Comparative Example 2 | 44.0 | 0.65 | 0.70 | 0.11 | 0.05 | 1.28 | 5.66 | 0.97 | 75.8 |
| Comparative Example 3 | 37.1 | 0.86 | 0.70 | 0.11 | 0.05 | 1.08 | 6.32 | 0.82 | 75.9 |
| Example 2 | 44.0 | 0.65 | 0.60 | 0.09 | 0.05 | 1.10 | 4.63 | 1.01 | 91.8 |
| Comparative Example 4 | 37.1 | 0.86 | 0.60 | 0.09 | 0.05 | 0.93 | 5.17 | 0.85 | 91.4 |
| Comparative Example 5 | 44.0 | 0.65 | 0.70 | 0.09 | 0.05 | 1.28 | 4.63 | 0.90 | 70.3 |
| Comparative Example 6 | 37.1 | 0.86 | 0.70 | 0.09 | 0.05 | 1.08 | 5.17 | 0.75 | 69.4 |
| Example 3 | 50.7 | 0.50 | 0.60 | 0.09 | 0.05 | 1.27 | 4.11 | 1.16 | 91.3 |
| Example 4 | 56.4 | 0.40 | 0.60 | 0.09 | 0.05 | 1.41 | 3.65 | 1.29 | 91.5 |
| Example 5 | 50.7 | 0.50 | 0.50 | 0.11 | 0.05 | 1.06 | 5.02 | 1.03 | 97.2 |
| Example 6 | 56.4 | 0.40 | 0.45 | 0.11 | 0.05 | 1.06 | 4.47 | 1.06 | 100.0 |
| Example 7 | 63.6 | 0.30 | 0.40 | 0.11 | 0.05 | 1.06 | 3.78 | 1.06 | 100.0 |
| Comparative Example 7 | 37.1 | 0.86 | 0.70 | 0.11 | 0.005 | 1.08 | 6.32 | 1.05 | 97.2 |

Table 3 clearly indicates the following.

In Examples 1 to 7, a high permeate flow rate is obtained in a stable manner even after passing water for 500 hours. In particular, no decrease in permeate flow rate had occurred even after 500 hours had elapsed in Examples 6 and 7.

In Comparative Examples 1 and 4, a little decrease in permeate flow rate occurred, but the permeate flow rate after 500 hours is low since the initial permeate flow rate is low. In Comparative Examples 2 and 5, in which the initial permeate flow rate is high, the large decrease in permeate flow rate results in the permeate flow rate after 500 hours being low. In Comparative Examples 3 and 6, the large decrease in permeate flow rate leads to the permeate flow rate after 500 hours being low likewise. With raw water in which the concentration of high-molecular-weight organic matter having a molecular weight of 10,000 or more was low as in Comparative Example 7, the decrease in permeate flow rate was slow.

INDUSTRIAL APPLICABILITY

The present invention, which is applicable to various reverse osmosis membrane devices used in applications such as desalination of seawater, production of ultrapure water, processing of industrial water, and recovering of discharged water, is particularly suitable for reverse osmosis membrane devices that process biologically treated water, in particular, MBR-treated water.

Although the present invention is herein detailed on the basis of a particular embodiment, it will be understood by 3 Solid-liquid separation means
4 Filtration means
5 Safety filter
6 Reverse osmosis membrane device
7 MBR (immersion membrane separation device)
10 Reverse osmosis membrane
11 Raw water spacer
12 Permeate spacer

The invention claimed is:

1. A method for operating a reverse osmosis membrane device that treats raw water containing high-molecular-weight organic matter,
   wherein the raw water contains high-molecular-weight organic matter having a molecular weight of 10,000 g/mol or more at a concentration of 0.01 ppm or more,
   wherein the reverse osmosis membrane device is equipped with
      a spiral-type reverse osmosis membrane element that has a membrane surface area≥44 m² (square meters), and
      a raw water spacer having a thickness of 0.2-0.6 mm,
   wherein the reverse osmosis membrane device is operated at a permeate flux of 0.45 m/d or less, and
   wherein the reverse osmosis membrane device is operated with a flow rate of concentrate being 0.1 m/s or more in linear velocity.

2. The method for operating a reverse osmosis membrane device according to claim 1, wherein the raw water is MBR-treated water.

3. The method for operating a reverse osmosis membrane device according to claim 1, wherein the reverse osmosis membrane device is further equipped with a permeate spacer having a thickness of 0.1-0.25 mm.

\* \* \* \* \*